(12) United States Patent
Aschenbener et al.

(10) Patent No.: US 11,464,079 B1
(45) Date of Patent: Oct. 4, 2022

(54) AUTOMATIC COUPLING OF A GATEWAY DEVICE AND A VEHICLE

(71) Applicant: Samsara Networks Inc., San Francisco, CA (US)

(72) Inventors: Justin Robert Aschenbener, Chicago, IL (US); Christopher Cunningham Frost, San Francisco, CA (US); Andrew Robbins, San Francisco, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 17/455,176

(22) Filed: Nov. 16, 2021

Related U.S. Application Data

(60) Provisional application No. 63/140,724, filed on Jan. 22, 2021.

(51) Int. Cl.
| | |
|---|---|
| H04W 88/16 | (2009.01) |
| H04W 4/40 | (2018.01) |
| G08G 1/00 | (2006.01) |
| G07C 5/00 | (2006.01) |
| H04W 84/00 | (2009.01) |

(52) U.S. Cl.
CPC ............ *H04W 88/16* (2013.01); *G07C 5/008* (2013.01); *G08G 1/20* (2013.01); *H04W 4/40* (2018.02); *H04W 84/005* (2013.01)

(58) Field of Classification Search
CPC ..... H04W 88/16; H04W 4/40; H04W 84/005; G07C 5/008; G08G 1/20
USPC ............................................................ 701/1
See application file for complete search history.

(56) References Cited

U.S. PATENT DOCUMENTS

| | | | | |
|---|---|---|---|---|
| 10,331,687 | B2 * | 6/2019 | Merg ................... | G06F 16/2471 |
| 10,525,911 | B2 * | 1/2020 | Haga ................... | B60R 16/0231 |
| 10,957,128 | B2 * | 3/2021 | Grunzinger, Jr. ....... | G07C 5/008 |
| 2008/0227411 | A1 * | 9/2008 | Martinez ................. | B60D 1/62 |
| | | | | 455/90.1 |

(Continued)

FOREIGN PATENT DOCUMENTS

| | | | | |
|---|---|---|---|---|
| EP | 3691196 | A1 * | 8/2020 | ......... G06F 13/4221 |
| EP | 3745657 | A1 * | 12/2020 | ....... H04L 12/40006 |

(Continued)

OTHER PUBLICATIONS

Ahmad et al., "Vehicular Data Acquisition System for Fleet Management Automation," 2011, Publisher: IEEE.*

(Continued)

*Primary Examiner* — Tuan C To
(74) *Attorney, Agent, or Firm* — Nicholson, De Vos, Webster & Elliott, LLP

(57) ABSTRACT

A method comprising receiving first data from a first gateway device, determining that the first data includes an identifier of a first vehicle, and responsive to determining that the first data includes the identifier of the first vehicle, determining, based on the identifier of the first vehicle, that the first vehicle is a known vehicle in a fleet management system and responsive to determining, based on the identifier of the first vehicle, that the first vehicle is a known vehicle in the fleet management system, coupling the first gateway device with the first vehicle in the fleet management system, wherein the coupling causes data received from the first gateway device to be identified as data of the first vehicle.

20 Claims, 6 Drawing Sheets

(56) References Cited

U.S. PATENT DOCUMENTS

| | | | | |
|---|---|---|---|---|
| 2013/0147617 A1* | 6/2013 | Boling | ............... | G08B 21/18 |
| | | | | 340/431 |
| 2017/0116792 A1* | 4/2017 | Jelinek | ............... | G07C 5/085 |
| 2018/0278616 A1* | 9/2018 | Sakamoto | ............ | H04L 63/10 |

FOREIGN PATENT DOCUMENTS

| | | | | |
|---|---|---|---|---|
| EP | 3748588 A1 * | 12/2020 | ............. | G06F 21/32 |
| WO | WO-2013088210 A1 * | 6/2013 | ............. | H04L 67/12 |
| WO | WO-2019240669 A1 * | 12/2019 | ........... | H04L 63/108 |

OTHER PUBLICATIONS

Geotab, "GO 9 Device Install", Available Online at <https://www.geotab.com/documentation/go9-device-install/>, Rev 1.7, Aug. 2020, 8 pages.

Molly B., "Pairing or Deactivating Gateways in Bulk", Samsara Support, available online at <https://kb.samsara.com/hc/en-us/articles/360042729052-Pairing-or-Deactivating-Gateways-in-Bulk->, updated Sep. 2020, 4 pages.

* cited by examiner

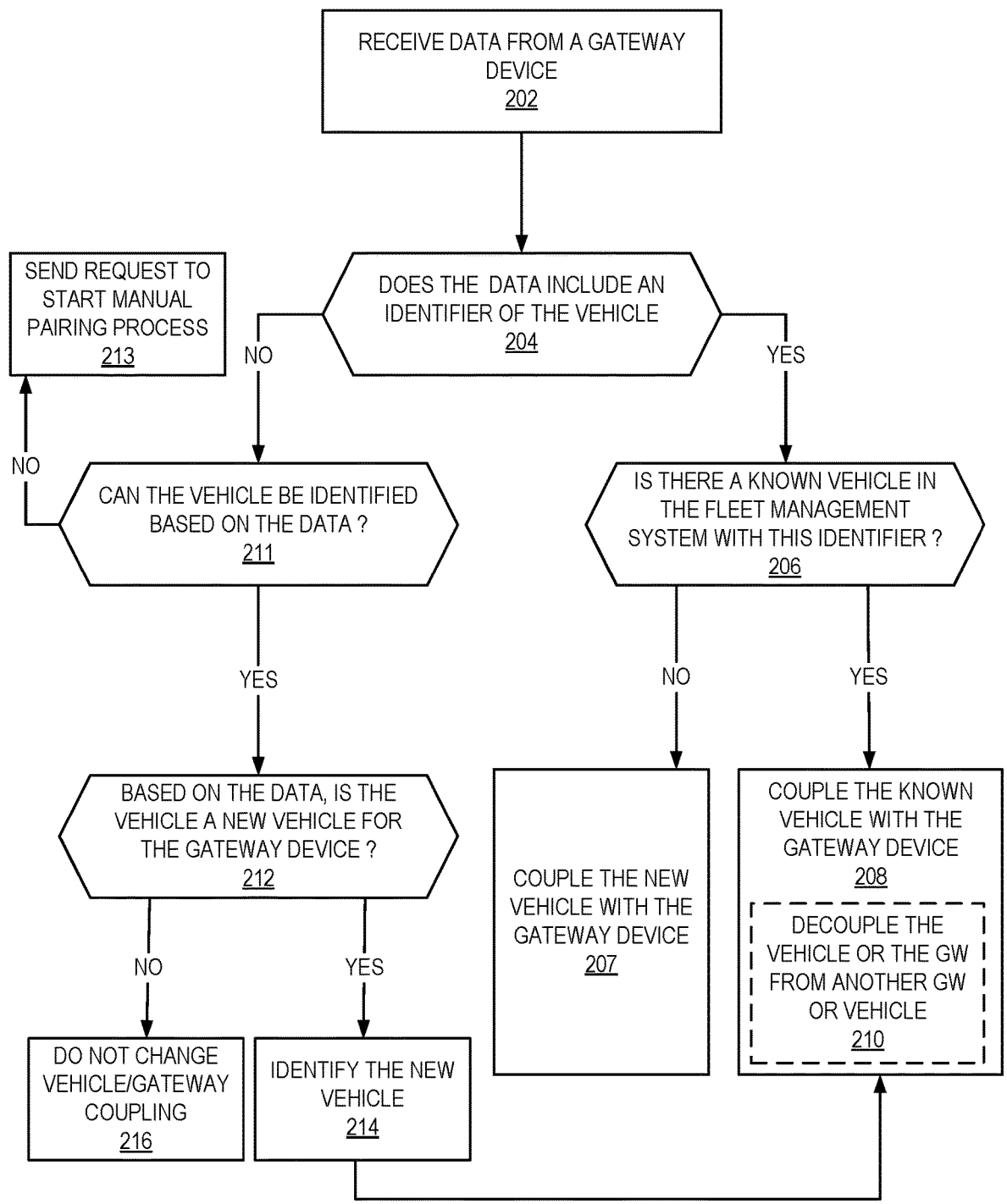

U.S. 11,464,079 B1

AUTOMATIC COUPLING OF A GATEWAY DEVICE AND A VEHICLE

CROSS-REFERENCE TO RELATED APPLICATIONS

This application claims the benefit of U.S. Provisional Application No. 63/140,724 filed Jan. 22, 2021, which is hereby incorporated by reference.

TECHNICAL FIELD

One or more embodiments relate to the field of fleet management; and more specifically, to the automatic coupling of a gateway device and a vehicle.

BACKGROUND ART

A gateway device or gateway is an electronic device that is used to interface between local and wide area networks. A gateway device gathers data from components such as sensors or local computing systems, and transmits the data to remote computing devices. Additionally or alternatively, a gateway device allows the remote computing devices to control and/or update the local components. The connection to the wide area network is typically a wireless connection (e.g., Wi-Fi, cellular connection, etc.). A gateway device can be mounted on a vehicle. The vehicle can be a vehicle such as a truck, a car, a snowplow, a heavy machinery equipment, etc. The gateway device records and/or obtains data related to the vehicle on which it is mounted and transmits the data to a computing device such as a server.

BRIEF DESCRIPTION OF THE DRAWINGS

The following figures use like reference numbers to refer to like elements. Although the following figures depict various exemplary embodiments, alternative embodiments are within the spirit and scope of the appended claims. In the drawings:

FIG. 2A illustrates a flow diagram of exemplary operations that can be performed for automatic coupling of a gateway device and a vehicle, in accordance with some embodiments.

DETAILED DESCRIPTION

Figure 1:
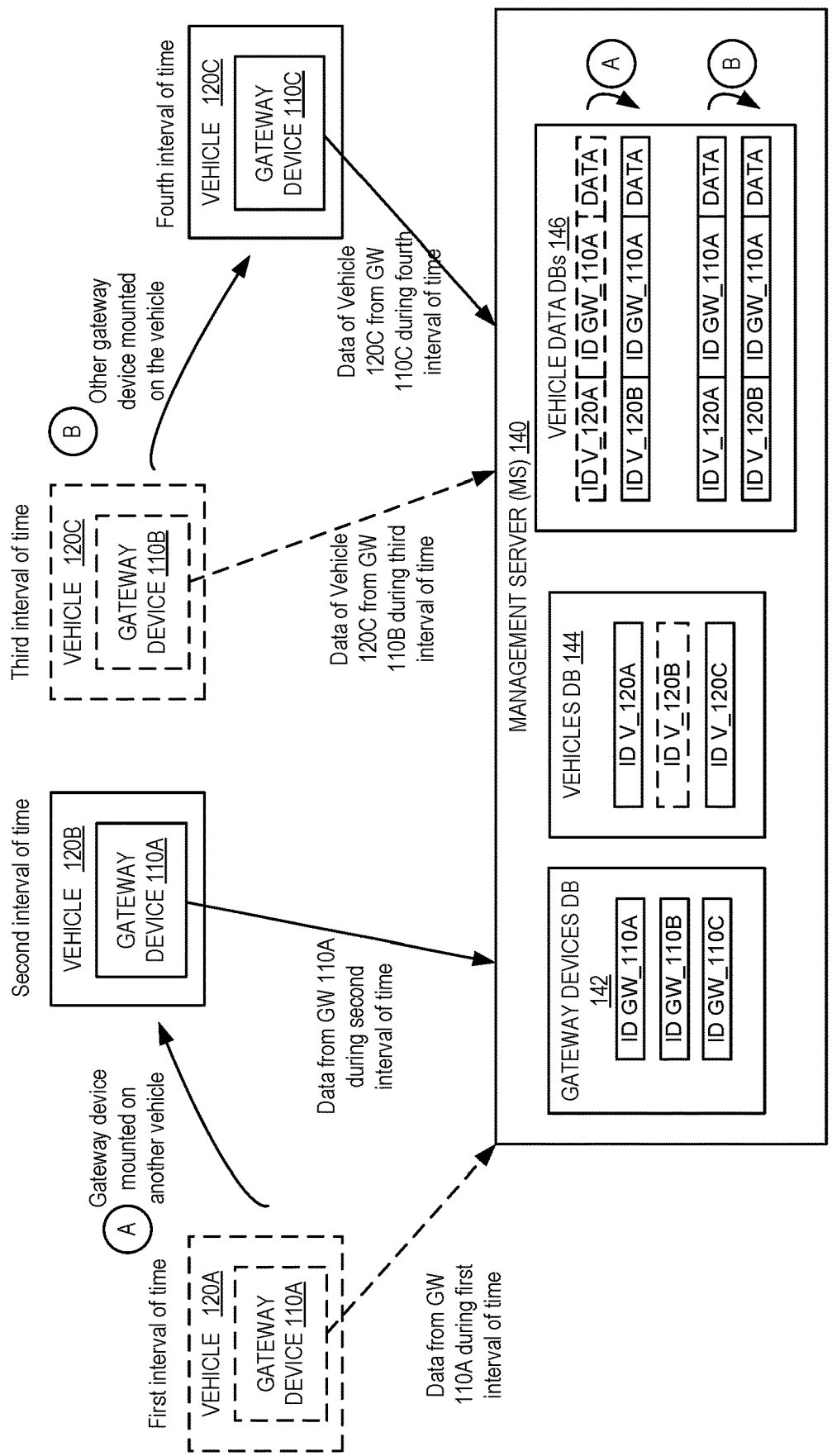
FIG. 1 is a block diagram illustrating a system for automatic coupling of a gateway device with a vehicle, according to some example embodiments.

The following description describes methods and apparatus for the automatic coupling of a gateway device.

Gateway devices are mounted on a vehicle through a manual coupling procedure. A gateway device is mounted to the vehicle. For example, the gateway device can be plugged into a port of the vehicle, such as the on-board diagnostics port. Once the gateway device is mounted onto the vehicle, a user/administrator uses a graphical user interface to manually enter information on the gateway device and the vehicle for associating the gateway device with the vehicle on which the gateway device is mounted. This association of the vehicle and the gateway device indicates to a management system that the data received from the gateway device is the data of the associated vehicle. In some scenarios, the gateway device can be moved from one vehicle to another vehicle. In other scenarios, a new gateway device can be mounted on a vehicle on which another gateway device was previously mounted. To make this change or swap of gateways, the association of the gateway device with the vehicle is manually removed by a user through the graphical user interface and the gateway device or vehicle are manually associated with another vehicle or gateway device respectively. This procedure can be referred to as a manual decoupling/coupling. The manual decoupling/coupling procedures take time. Further, failure to follow the procedure leads to associating data from one vehicle with another vehicle (treating data from different vehicles as if they were the same vehicle). Due to the time-consuming nature of the decoupling/coupling procedure, users of the gateway devices do not always follow it. This causes the vehicle's tracking data to be corrupted and the management system to not operate as efficiently as it could. Gateway devices change vehicles more often than expected. For example, a GW can be used for multiple vehicles to avoid having to license more GWs; to keep capacity of a fleet of vehicle constant, a user may use a GW on a rented vehicle when the vehicle from the fleet on which the vehicle was mounted is out of service or removed for maintenance. When the changes of GWs or vehicles is frequent so the cumulative time it takes to follow the manual decoupling/coupling procedure becomes more significant, the data of the vehicles is more corrupted, and the system operates less efficiently, etc. In addition, there is the need at times to replace a large number of GWs (e.g., new version of GW released), or a large number of vehicles (upgrade of the fleet of vehicles, etc.). The manual coupling/decoupling procedure process is highly inefficient, time consuming, costly, and prone to human error, especially when a high number of gateway devices needs to be installed, or frequent swaps of gateway devices is needed.

The embodiments described herein provide methods and systems for automatic coupling of a gateway device with a vehicle. In one embodiment, data of a first vehicle is received from a first gateway device. The system determines that the data of the first vehicle includes an identifier of the first vehicle. In response to determining that the data includes the identifier of the first vehicle, and in response to determining, based on the identifier of the first vehicle, that the vehicle is a known vehicle in the fleet management system, the first gateway device is coupled with the first vehicle in the fleet management system. The association of the first gateway device with the first vehicle in the fleet management system causes the fleet management system to record data received from the gateway device as data of the first vehicle. The system receives from a second gateway device data of a second vehicle. In response to determining that the data of the second vehicle does not include an identifier of the second vehicle, the system determines, based on the data of the second vehicle, that the second vehicle is a new vehicle on which the gateway device is mounted.

The embodiments described herein allow the automatic detection of a change of a gateway device from one vehicle to another vehicle. This allows the use of a gateway device for multiple vehicles in a fleet. For example, when a vehicle is no longer in use (e.g., a rental vehicle that is returned, a vehicle in maintenance, a vehicle used for another task that does not necessitate the tracking of the vehicle, etc.) the gateway device that was mounted on this vehicle can be re-used for another vehicle. The mechanisms described herein allow a seamless and efficient automatic decoupling of the gateway device from the previous vehicle and the automatic coupling of the gateway device with the new vehicle. In some embodiments, this automatic coupling/decoupling of the gateway device and the vehicle allow for a plug and play use of the gateway device. In some embodiments, the decoupling/coupling of the gateway device with the vehicles is performed without intervention of a user.

The embodiments described herein can further allow continuity in the data of a vehicle when a gateway device is decoupled from the vehicle and a new gateway device is mounted on the vehicle. The automatic detection and identification of the new gateway device allows to reconcile data of the vehicle received from the first gateway device and data of the vehicle received from the new gateway device. In some embodiments, the reconciliation of the data and the automatic decoupling and coupling of the vehicle and gateway devices is performed without intervention of a user. These mechanisms can be used when gateway devices are upgraded in a fleet of vehicles.

Overview

FIG. 1 is a block diagram illustrating a fleet management system 100 in which automatic coupling of a gateway device and a vehicle is enabled, according to some example embodiments. The illustrated system 100 includes vehicles 120A-C (which are also referred to as vehicles 120), gateway devices (GW) 110A-C (which can also be referred to as GWs 110), and a management server 140.

In some embodiments, the vehicles 120 can be part of a fleet of vehicles. In these embodiments, the fleet of vehicles belongs to an organization. The multiple elements of the fleet management system 100 may be owned and operated by the organization. Alternatively, different elements of the fleet management system 100 can be owned and/or operated by multiple entities. In some embodiments, the gateway devices can be owned separately from the management server 140. For example, the gateway devices 110 can belong to the organization but are compatible with and can be managed through the management server 140. In other embodiments, the gateway devices 110 and the management server 140 can belong to the same entity, while the vehicles 120 can be owned by another entity. While three vehicles and three GWs are illustrated, this is intended to be illustrative only and any number of vehicles and/or GWs can apply to the embodiments described herein. The vehicles are typically located remotely from the management server 140 and change location over a period of time. The vehicles 120 can be a tractor/trailer pairs. The vehicles 120 can be tractors, tow trucks, semi-trucks, light or heavy trucks or any other type of vehicles that is operative to be coupled with and pull a trailer. Alternatively, the vehicles 120 can be cars, vans, buses, specialized vehicles, or any combination thereof.

The gateway devices 110 are electronic devices that operate as advanced sensor platforms. The gateway devices 110 are operative to act as a communication interface towards the management server 140. The gateway devices 110 can provide a communication interface between components of the vehicles 120 and the management server 140, a communication interface between components of the gateway devices 110 and the management server 140, or a communication interface between third party components (e.g., wireless sensing devices) that are mounted on the vehicles and the management server 140. In some embodiments, the gateway devices 110 are designed for plug-and-play installation in a wide variety of vehicles. In these embodiments, the gateway devices 110 are operative to be physically connected to one or more components of the vehicles 120. The gateway devices 110 are operative to be connected to the management server 140 through a Wide Area Network (WAN) 130. The connection to the WAN 130 is a wireless connection (e.g., Wi-Fi, cellular connection, etc.). In some embodiments, the gateway devices 110, and the management server 140, may be subject to an intermittent connectivity with the WAN.

The gateway devices 110 are operative to record or obtain data related to the vehicle (e.g., data related to components of the vehicles (such as the engine of the vehicle) and/or data originating from sensors or cameras located on the vehicles 120 or within the gateway devices 110), and transmit the data to the management server 140. The data is indicative of a state of the vehicles and/or their environments. For example, the data may include location readings indicating the location of the vehicle on which the gateway device is mounted. In some embodiments, the data further includes additional sensor measurements for the vehicle (such as temperature, humidity, barometric pressure, $CO_2$ concentration, acceleration, sound, etc.). The data of the vehicle can include engine hours of the vehicle, odometer readings of the vehicle, fuel level of the vehicle, Diesel Exhaust Fluid (DEF) level of the vehicle, tire pressure of the vehicle, amount of time during which the engine of the vehicle is on, or a combination thereof. Alternatively or additionally, the data can include an identification of a driver of the vehicle, an identification of one or more trailers attached to the vehicle over time, an identification of a home yard of the vehicle, or any combination thereof. The gateway devices 110 can be used in the context of fleet management and provide operators with real-time location of vehicles and analytics, sensor data related to the vehicles and their environments, and/or Wi-Fi hotspot connectivity.

In some embodiments, the gateway devices 110 are operative to connect to a computing devices of the vehicles 120 on which they are respectively mounted. For example, the gateway device 110A can be coupled to the vehicle's computing device through an on-board diagnostics (OBD) port of the vehicle 120A. The gateway device 110A can obtain data pertaining to events that occur in the vehicle through the OBD. In some embodiments, other port or interfaces can be used for transfer of data from the vehicle's computing device to the gateway device without departing from the scope of the present embodiments. For example, other wired or wireless interfaces can be used. The gateway device may obtain from the vehicle's computing device the engine hours of the vehicle, odometer readings of the vehicle, tire pressure of the vehicle, idle engine speed, idle engine temperature, or a combination thereof. The data obtained from the vehicle's computing device can be referred to as diagnostics data. In some embodiments, the gateway devices 110A can further receive an identifier of the vehicle from the vehicle's computing device. The identifier uniquely identifies the vehicle from other vehicles. The identifier can be a vehicle identification number (VIN). The VIN serves as the vehicle's fingerprint, as no two vehicles in operation have the same VIN. In some embodiments, the vehicle's computing device does not provide the identifier of the vehicle to the gateway device.

In some embodiments, the gateway devices 110 are also operative to be coupled with one or more aftermarket devices (i.e., that are not installed by the vehicle's manufacturer), and which are external to the gateway devices. For example, the gateway devices 110 may be coupled with one or more wireless sensing devices (not illustrated), one or more cameras, etc. The wireless sensing devices (WSDs) are electronic devices that include one or more sensors for detecting physical events (e.g., temperature, humidity, barometric pressure, $CO_2$ concentration, acceleration, pressure, sound, movement, etc.) and recording sensor measurements in response to the detection of these physical events (e.g., recording changes in temperature, movement of an object (e.g., a door being closed/opened), sudden accelerations of a vehicle, etc.). The WSDs can be small electronic devices that are attachable to an object. The sensor measurements are stored in a non-transitory computer-readable medium of the WSDs. Each of the WSDs is operative to be coupled to a gateway device (e.g., gateway devices 110A-C), and establish a communication channel to transfer the recorded sensor measurements. In some embodiments, each of the WSDs can connect to the gateway device through a wireless communication interface (e.g., Bluetooth Low Energy (BLE), Wi-Fi). Thus, the gateway device is operative to detect WSDs and negotiate a connection to the WSDs. In some embodiments, the gateway devices 110 are implemented, as described in further details, with reference to FIG. 3.

The management server 140 is a cloud-based server operative to receive data from one or more gateway devices 110. The data received from the gateway devices is used to track the vehicles 120 and/or to obtain information on the state of the vehicles 120 or their respective environments. In some embodiments, the management server 140 is implemented as described in further details with reference to FIG. 4. In some embodiments, the management server 140 is operative to receive from the gateway devices 110 data related to the vehicles on which the devices are mounted. The data can include diagnostics data, sensor measurements from the GWs, the vehicle, or the WSDs. In some embodiments, the management server 140 is operative to receive an identifier of the vehicles. Further, the management server 140 may receive an identifier of the GW. The identifier of the GW uniquely identifies the GW in the fleet management system. In some embodiments, when the management system is a multi-tenant system that supports multiple organization, the identifier of the GW can be tied to an identifier of an organization to which the GW belongs. In some embodiments, the management server 140 is operative to receive data from the GW and determine additional information/data on the vehicle's on which the GW is mounted. For example, the home yard of the vehicle, the trailer to which the vehicle is connected, and/or other information can be automatically determined by the management server from the location of the GW, and/or other information.

The management server 140 includes a GWs database (DB) 142, a vehicles DB 144, and a vehicle data DBs 146. The GWs DB 142 includes information related to the GWs. For example, the GW DB includes a set of GW identifiers that uniquely identify the respective GWs in the fleet management system 100. The GW DB may include additional information on the GW, i.e., the type of the GW, the organization to which the GW belongs, the version of the GW, and an associated vehicle to which the GW is coupled. More or less parameters can be stored in the GW DB for each one of the GWs in the system. The vehicles DB 144 includes information related to the vehicle. For example, the vehicles DB includes a set of vehicle identifiers that uniquely identify the respective vehicles in the fleet management system 100. In some embodiments, the vehicle identifiers can be the VIN of the vehicles. Additionally or alternatively, the vehicle identifiers can include unique identifiers defined for the vehicles in the system 100 that are different from the VINs of the vehicles. In these embodiments, a vehicle may have one or two identifiers (e.g., only the VIN, only the system's vehicle identifier, or the VIN and the system's vehicle identifier) that can be used to identify the vehicle in the system 100. In some embodiments, the system's vehicle identifier can be linked or can include an identifier of the organization to which the vehicle belongs. The vehicles DB 144 may include additional information on the vehicles, i.e., the type of vehicle (make, model), the organization to which the vehicle belongs, the year of the vehicle, the color of the vehicle, and an associated GW to which the vehicle is coupled. More or less parameters can be stored in the vehicles DB 144 for each one of the vehicles in the system 100. The management server 140 also include a vehicle data DB 146. The vehicle data database includes data of vehicles that is received from one or more GWs.

FIG. 1 illustrates two exemplary scenarios, A and B, in which automatic coupling of a vehicle and GW can be performed. In a first scenario, A, the GW 110A is mounted on the vehicle 120A during a first interval of time, the GW 110A is removed from the vehicle 120A and moved to vehicle 120B. The GW 110A is mounted on vehicle 120B for the duration of a second interval of time. The second interval of time occurs later than the first interval of time. In some embodiments, there may be a period of time between the first interval of time and the second interval of time during which the GW 110A is not mounted on any vehicles. In other embodiments, the GW is immediately mounted on the vehicle 120B after being removed from the vehicle 120A such that the second interval of time immediately follows the second interval of time. In some embodiments, vehicle 120B is a vehicle on which a different GW was mounted before GW 110A. In these embodiments, the management server 140 may have received data of the vehicle 120B from this other GW before receiving data of the vehicle from GW 110A. In other embodiments, GW 110A is the first GW to be mounted on the vehicle 120B and no data of the vehicle was received from any GWs before installation of GW 110A. In these embodiments, the vehicle 120B can be referred to as a new vehicle, as it is new to the management server and no data was previously recorded for that vehicle. The management server 140 is operative to receive data from GW 110A during the first interval of time for vehicle 120A and receive data from GW 110A during the second interval of time for vehicle 120B. The management server 140 is operative to automatically detect that the GW 110A has been moved to a different vehicle, vehicle 120B. Following the automatic detection that the GW 110A has been moved from one vehicle to another, the management server 140 is operative to decouple the GW 110A from the vehicle 120A in the system 100 and to automatically couple the GW 110A with the vehicle 120B. The operations of the management server 140 will be described in further detail with respect to the flow diagrams of FIG. 2A-C.

In the second scenario, B, the GW 110B is mounted on the vehicle 120C during a third interval of time, the GW 110B is removed from the vehicle 120C and another GW 110C is mounted on the vehicle 120C, for operation during the fourth interval of time. The fourth interval of time occurs later than the third interval of time. In some embodiments, there may be a period of time between the third interval of time and the fourth interval of time during which the vehicle 120A does not have any GWs mounted on it. In other embodiments, the GW is immediately mounted on the vehicle 120C after the other GW has been removed from the vehicle 120C such that the fourth interval of time immediately follows the third interval of time. The management server 140 is operative to receive data from GW 110B during the third interval of time for vehicle 120C and receive data from GW 110C during the fourth interval of time for vehicle 120C. The management server 140 is operative to automatically detect that the GW 110B has been removed from vehicle 120C and that a new GW 110C is mounted on vehicle 120C. Following the automatic detection that a swap of GWs occurred in vehicle 120C, the management server 140 is operative to decouple the GW 110B from the vehicle 120C in the system 100 and to automatically couple GW 110C with vehicle 120C. The operations of the management server 140 will be described in further detail with respect to the flow diagrams of FIG. 2A-C.

Exemplary Operations

The operations in the flow diagrams are be described with reference to the exemplary embodiments in the other figures. However, the operations of the flow diagrams can be performed by embodiments other than those discussed with reference to the other figures, and the embodiments discussed with reference to these other figures can perform operations different from those discussed with reference to the flow diagrams.

FIG. 2A illustrates a flow diagram of exemplary operations that can be performed for automatic coupling of a gateway device and a vehicle, in accordance with some embodiments. The operations of FIG. 2A can be performed by a management server 140.

At operation 202, the management server 140 receives data from a gateway device. For example, in scenario A, the management server 140 receives data from GW 110A. The data received relates to the vehicle 120B when the GW 110A is mounted on vehicle 120B during the second interval of time. In another example, in scenario B, the management server receives data from GW 110C. The data received from GW 110C relates to vehicle 120C when the GW 110C is mounted on vehicle 120C during the fourth interval of time. The data includes vehicle diagnostics data from a computing device of the vehicle. The vehicle diagnostic data may include engine hours of a vehicle, odometer readings of the vehicle, fuel level of the vehicle, Diesel Exhaust Fluid (DEF) level of the vehicle, tire pressure of the vehicle, or any combination thereof. The data can include an identification of a driver of the vehicle, an identification of one or more trailers attached to the vehicle over time, an identification of a home yard of the vehicle, one or more routes of the vehicle, or any combination thereof. The data can further include sensor measurements recorded by the GW or obtained by the GW from the vehicle and/or WSDs. In some embodiments, the data includes an identifier of the vehicle on which the GW is mounted. In other embodiments, the data does not include the identifier of the vehicle. The flow of operations moves to operation 204.

At operation 204, the management server 140 determines that the data includes an identifier of a first vehicle. The management server 140 may determine whether the data includes the VIN of the vehicle on which the GW is mounted.

When the data includes the identifier of the vehicle, the flow of operations moves to operation 206. The identifier was obtained by the GW from the vehicle's computing device and uniquely identifies the vehicle. Alternatively when the data does not include an identifier of the vehicle, the flow of operations moves to operation 212. For example, in scenario A, the management server 140 determines whether the data includes a VIN of vehicle 120B. In another example, in scenario B, the management server 140 determines whether the data includes the VIN of vehicle 120C.

At operation 206, the management server 140 determines, based on the identifier of the first vehicle, that the first vehicle is a known vehicle in the fleet management system. For example, the management server 140 may look up the vehicles DB 144 and determine whether the identifier of the vehicle is included in the vehicles DB 144. Upon determining that the vehicle is known in the fleet management system 100, the flow of operations move to operation 208. In scenario A, the management server 140 receives in the data from GW 110A, the identifier of vehicle 120B. The management server 140 looks up DB 144 and determines that the identifier of vehicle 120B is included in the DB 144. In scenario B, the management server 140 receives the identifier of vehicle 120C in the data received from GW 110C. The management server 140 determines that the identifier is stored in the DB 144.

At operation 208, the management server 140 couples the gateway device with the first vehicle in the fleet management system. In scenario A, the management server 140 couples GW 110A with vehicle 120B. In scenario B, the management server 140 couples GW 110C with vehicle 120C. In some embodiments, coupling a GW with a vehicle includes updating one or multiple ones of the databases 142, 144, 146 to include an identifier of the vehicle in relation with an identifier of the GW. The coupling of a vehicle and GW causes data received from the gateway device to be identified as data of the vehicle. In scenario A, the coupling of vehicle 120B and GW 110A causes data received from GW 110A to be identified as data of vehicle 120B instead of being identified as data of vehicle 120A. The operations herein enabled the automatic detection of the swap of GW 110A from vehicle 120A to vehicle 120B without intervention of a user or an administrator. In scenario B, the coupling of vehicle 120C and GW 110C causes data received from GW 110C during the fourth interval of time to be identified as data of vehicle 120C instead of identifying data received from GW 110B as data of vehicle 120C during that same interval of time. The GW 110B can be used for/mounted on another vehicle. The operations herein enabled the automatic detection of the swap of GW 110B to GW 110C in vehicle 120C without intervention of a user or an administrator. In these embodiments, the automatic detection of the swap is performed based on an identifier of the vehicle that is received from the GW.

In some embodiments, operation 208 further includes optional operation 210. At operation 210, the GW is decoupled from another vehicle. For example, in scenario A, the GW 110A is decoupled from vehicle 120A. The decoupling of vehicle 120A and GW 110A can include modifying DBs 142, 144, and/or 146 to remove the association between the vehicle identifier of vehicle 120A and an identifier of GW 110A for the second interval of time. The decoupling of GW 110A and vehicle 120A and coupling of GW 110A and vehicle 120B causes data received from the GW 110A during the first interval of time to be identified with vehicle 120A while the data received from the GW 110A during the second interval of time to be identified with vehicle 120B.

In some embodiments, the decoupling is not performed as the GW may not have been coupled with any vehicles before vehicle 120B. In scenario B, vehicle 120C is decoupled from GW 110B. The decoupling of vehicle 120C and GW 110B can include modifying DBs 142, 144, and/or 146 to remove the association between the vehicle identifier of vehicle 120C and an identifier of GW 110B for the fourth interval of time. The decoupling of GW 110B and vehicle 120C and coupling of GW 110C and vehicle 120C causes data received from the GW 110B during the third interval of time to be identified with vehicle 120C and data received from the GW 110C during the fourth interval of time to be identified with vehicle 120C. In some embodiments, the decoupling is not performed as the vehicle 120C may not have been coupled with any GWs before GW 110C.

Referring back to operation 206, upon determining that there is no known vehicle in the fleet management system with the identifier of the vehicle received from the gateway device, the flow of operations moves to operation 207. At operation 207, the GW is coupled with the vehicle. Coupling the GW with the vehicle includes storing an identifier of the vehicle in one or multiple ones of the databases 142, 144, and 146. The identifier of the vehicle was not present in the system before the receipt of its identifier from the GW. Referring to exemplary scenario A, upon receipt of the identifier of vehicle 120B from GW 110A, the management server 140 determines that no identifier of vehicle 120B was already present in the DBs and therefore creates one or more new entries for coupling the GW 110A with vehicle 120B. In some embodiments, coupling the GW with the vehicle can include creating a new vehicle object that is used for storing the information of the vehicle in the system 100, where the information includes the vehicle's identifier (e.g., VIN).

Returning to operation 204, when the data does not include an identifier of the vehicle, the flow of operations moves to operation 211. At operation 211, the management server determines whether the vehicle can be identified based on the data. When the vehicle cannot be identified based on the data, the flow of operations moves to operation 213. At operation 213, the management server sends a request to a user (e.g., operator of the vehicle, administrator, etc.) to start the manual coupling process of the GW with the vehicle. When the vehicle can be identified based on the data, the flow of operations moves to operation 212. At operation 212, the management server determines, based on the data, if the gateway device is mounted on a new vehicle for the gateway device. The new vehicle can be a vehicle that is different from the vehicle on which the gateway device was previously mounted. For example, the new vehicle can be vehicle 120B for GW 110A in scenario A or alternatively vehicle 120C for GW 110C, in scenario B. In one example, the new vehicle can be a vehicle from which the gateway device was swapped for another gateway device and then later reinstalled. Additionally or alternatively, the new vehicle can be a vehicle that is not known to the fleet management system. When the vehicle is not new to the GW, this indicates that the vehicle is determined to be the same vehicle to which the GW was previously mounted, and with which the GW is coupled in the system 100. In this case, the flow of operations moves to operation 216, at which the management server 140 does not modify the existing coupling between the vehicle and GW in the system. Alternatively, when it is determined that the vehicle is new for the GW, the flow moves to operation 214, at which the new vehicle is identified. When the vehicle is identified, the flow of operations moves to operation 208, at which the new vehicle is coupled with the GW.

Figure 2B:
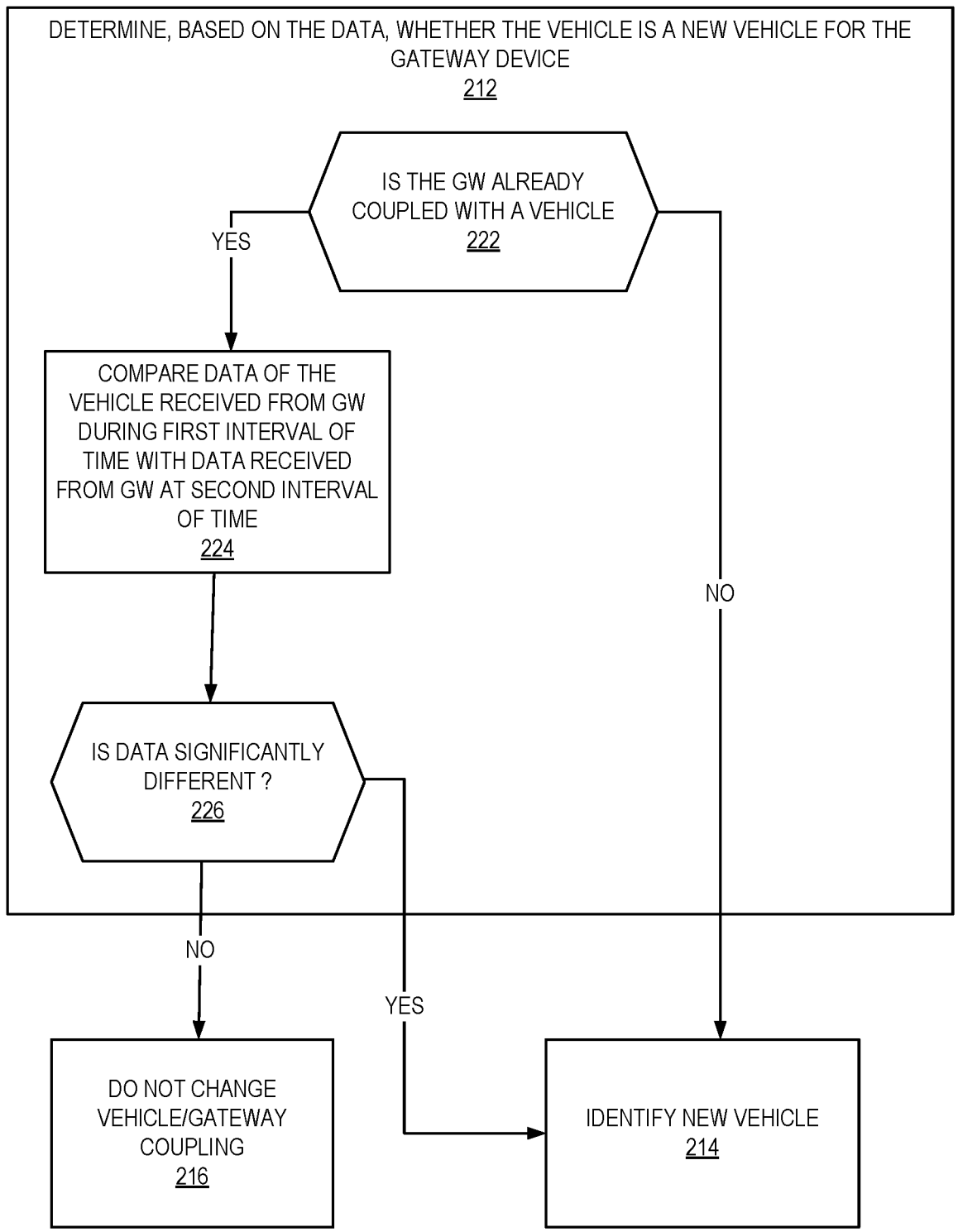
FIG. 2B illustrates a flow diagram of exemplary operations that can be performed for determining whether a vehicle is a new vehicle for a gateway device, according to some example embodiments.

FIG. 2B illustrates a flow diagram of exemplary operations that can be performed for determining, based on data received from the GW, that the GW is coupled with a new vehicle for the GW, in accordance with some embodiments. At operation 222, the management server 140 determines whether the GW is already coupled with a vehicle. For example, management server determines whether GW 110A is already coupled with a vehicle. The management server 140 may look up one or more of the databases 142, 144, and/or 146 and determines whether the GW 110A is associated with an identifier of a vehicle. In scenario A, the management server 140 may determine that GW 110A is coupled with vehicle 120A. In scenario B, the management server may determine that GW 110C is not coupled with any vehicles (e.g., GW 110C is a new GW in the fleet management system). Upon determining that the GW is not coupled with a vehicle, this causes the management server 140 to determine that the GW is mounted on a vehicle that is new for the GW. In other words, that the GW has just been mounted on to this new vehicle. When it is determined that the GW is mounted on a new vehicle for the GW, the flow of operations moves to operation 214.

Alternatively, upon determining that the GW is already coupled with a vehicle in the fleet management system 100, the flow of operations moves to operation 224. At operation 224, the management server 140 compares the data received from the GW (e.g., the most recent data) with data previously received from the GW. The data previously received from the GW is identified with the vehicle to which the GW is coupled. In scenario A, the management server 140 determines how the data received from the GW 110A during the first interval of time, which is related to vehicle 120A compares to the data received from GW 110A during the second interval of time. The comparison of the data can include comparing the latest data received from GW 110A during the first interval of time and the first values received from GW 110A during the second interval of time. In scenario B, the management server 140 determines how the data received from the GW 110C during the fourth interval of time, which is related to vehicle 120C compares to the data received from GW 110C during the third interval of time. For example, a value of engine hours of the vehicle 120C received from GW 110B at the end of the third interval (e.g., latest value of engine hours of vehicle 120C recorded in the system 100) is compared with a first value of the engine hours received from GW 110C during the fourth interval of time. This comparison can be performed for one or multiple ones of the data types received from the GW, such as the odometer readings of the vehicle, tire pressure of the vehicle, engine speed of the vehicle, engine temperature of the vehicle, engine hours. The comparison can further be performed for other data received from the GW or determined by the management server from data received from the GW. For example, sensor measurements, the data can include an identification of a driver of the vehicle, an identification of one or more trailers attached to the vehicle over time, an identification of a home yard of the vehicle, can be alternative or additional data that can be compared. In some embodiments, the comparison of the data can include comparing the list of data types available.

The flow of operations moves to operation 226, at which the management server 140 determines how different the compared data is. In some embodiments, determining that the data is different includes determining that a difference between data from an earlier interval of time (e.g., first interval of time, or third interval of time) and data from a later interval of time (e.g., the second interval of time or the fourth interval of time) is greater than a given threshold. The threshold can be fixed or dynamic and can depend on the type of data that is compared. For example, a threshold may depend on the time that elapses between the first and second intervals of time, or between the third and fourth intervals of time. In some embodiments, compared data is considered to be significantly different if it is unrealistic or does not obey the laws of physics. For example, monotonically increasing data (e.g., odometer reading or engine hours) for a vehicle should never decrease over time so if the comparison of data indicates that monotonically increasing data decreased over time then this is considered to be significantly different. As another example, for monotonically increasing data there are often physical limits to how much the data can increase over time so if the comparison of data indicates that monotonically increasing data increased in a manner that exceeds the physical limits, then this is considered to be significantly different. For example, engine hours can only increase by 24 hours per day at most. If the comparison indicates that engine hours increased by more than physically possible (e.g., the engine hours increased by more than 48 hours over two days) then this is considered to be significantly different. As another example, there is a limit to how much an odometer reading can increase over time if it is assumed that the vehicle has a maximum speed (e.g., the most an odometer reading can increase over a 24 hour period of time assuming that the maximum speed of the vehicle is 80 miles per hour is 1,920 miles (80 miles per hour multiplied by 24 hours)). If the comparison indicates that the odometer reading increased by more than physically possible then this is considered to be significantly different. In some embodiments, for non-monotonically increasing data that is expected to stay more or less the same over time (e.g., tire pressure, engine speed, engine temperature, etc.), a change of more than 5 percent from the average for the vehicle may be considered to be significantly different (of course, other thresholds can be used). In some embodiments, a change in the list of data types available in the data may be considered to be significantly different (e.g., losing more than one data type is uncommon and thus be considered as significantly different).

When it is determined that the data is significantly different, the flow moves to operation 214. When the data is significantly different, this is an indication that the most recent data received from the GW (e.g., data received during the second interval of time from GW 110A) is data of a different vehicle than the one for which data was received earlier from the GW (e.g., data received during the first interval of time from GW 110A). When it is determined that the data is not significantly different, the flow moves to operation 216. When the data is not significantly different, this is an indication that the most recent data received from the GW (e.g., data received during the fourth interval of time from GW 110C) is data of the same vehicle than the one for which data was received earlier from the GW or from another GW (e.g., data received during the third interval of time from GW 110B).

Figure 2C:
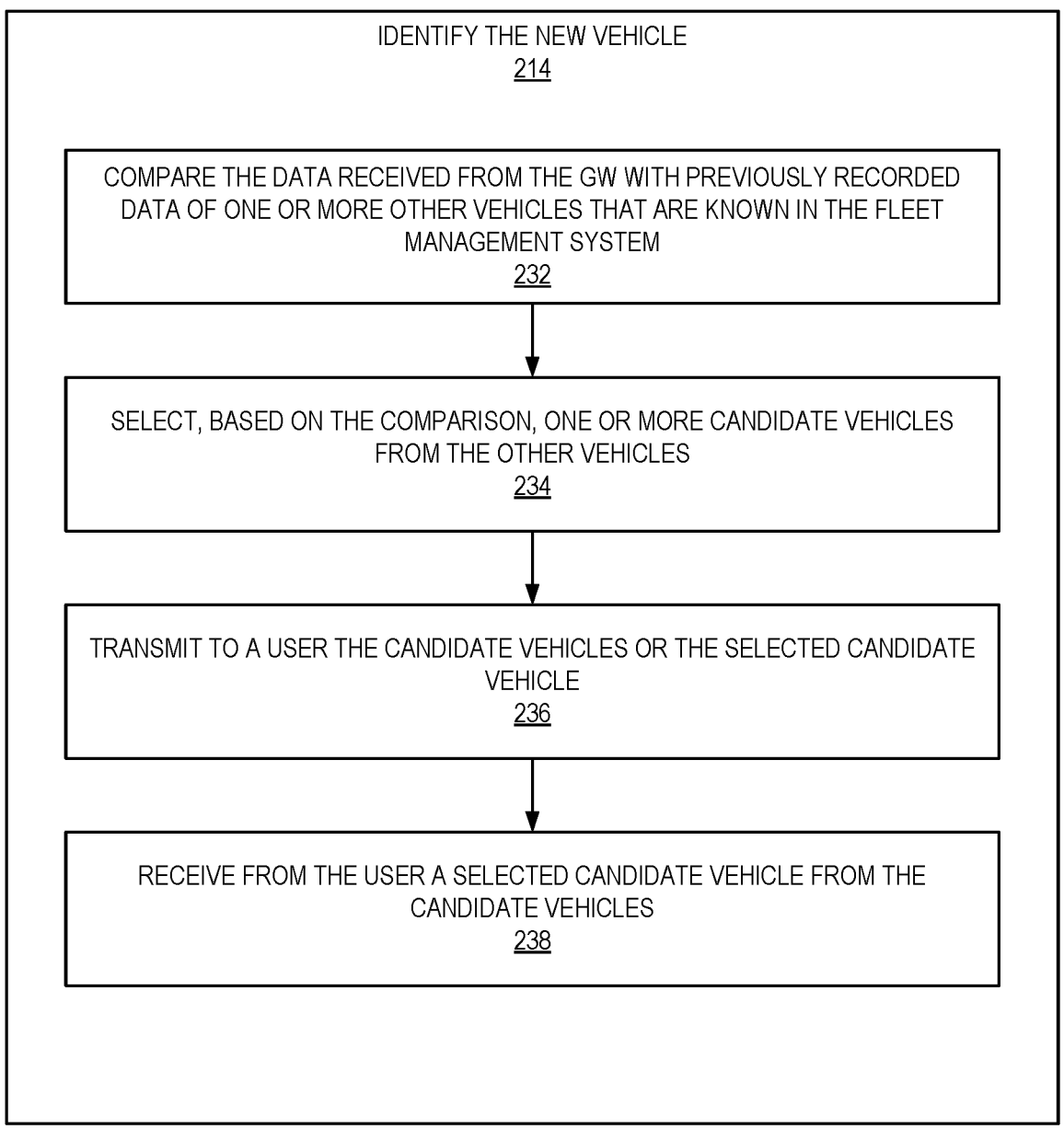
FIG. 2C illustrates a flow diagram of exemplary operations that can be performed for identifying a vehicle, according to some example embodiments.

FIG. 2C illustrates a flow diagram of exemplary operations that can be performed for identifying a new vehicle for the gateway device, in accordance with some embodiments. At operation 232, the management server 140 compares the data received from the GW (e.g., data received from GW 110A during the second interval of time, or data received from GW 110C during the fourth interval of time) with previously recorded data of one or more other vehicles that are known in the fleet management system. This comparison can be performed for one or multiple ones of the data types received from the GW, such as the engine hours, the odometer readings of the vehicle, fuel level of the vehicle, Diesel Exhaust Fluid (DEF) level of the vehicle, tire pressure of the vehicle, amount of time during which the engine of the vehicle is on. The comparison can further be performed for other data received from the GW or determined by the management server from data received from the GW. For example, sensor measurements, the data can include an identification of a driver of the vehicle, an identification of one or more trailers attached to the vehicle over time, an identification of a home yard of the vehicle, can be alternative or additional data that can be compared.

The flow of operations moves to operation 234. At operation 234, the management server 140 selects, based on the comparison, one or more candidate vehicles from the other vehicles. In some embodiments, the management server 140 selects ones or multiple ones of couples the gateway device (e.g., GW 110A or GW 110C) with the selected candidate vehicle that have data that is within a given threshold of the data received from the GW device. In some embodiments, candidate vehicles are selected based on filtering out any vehicles known in the fleet management system that do not have data that is realistic/possible in view of the data received from the GW. For example, if the data received from the GW indicates that the vehicle has 10,000 engine hours, then any vehicles known in the fleet management system that have more than 10,000 engine hours can be filtered out. A similar filtering can be performed for odometer reading or other data type that is monotonically increasing. In some embodiments, the flow of operations moves to optional operation 236. At operation 236, the management server 140 transmits the candidate vehicles or the selected candidate vehicle to a user. At operation 238, the management server 140 receives a selected candidate vehicle from the candidate vehicles from the user. Alternatively, the user can transmit a confirmation that the selected candidate vehicle is accurate. In some embodiments, the user can reject the candidates or the selected vehicle. The rejection of the candidates/selected vehicle can cause the management server 140 to repeat the operation of identification of the vehicle or to initiate a manual coupling process for the GW and vehicle. Upon receipt of the confirmation and/or selection from the user, or upon automatically selecting the candidate vehicle, the flow of operations moves to operation 214, at which the management server couples the gateway device (e.g., GW 110A or GW 110C) with the selected candidate vehicle (e.g., vehicle 120B or vehicle 120C) in the fleet management system 100.

In some embodiments, when the data is compared to data of other vehicles that are known in the system 100 (operation 232) no valid candidate vehicle is found in the system. For example, this may occur if the vehicle is a newly deployed vehicle and the management server 140 does not have any data on the vehicle yet. In these embodiments, the management server 140 couples the gateway device from which the data are received with a new vehicle in the fleet management system. In some embodiments, coupling the GW with the new vehicle can include creating a new vehicle object for storing the information related to the new vehicle. The management server 140 may create an identifier for identifying the vehicle in the system 100, and associate this identifier with the identifier of the GW in one or more of the databases 142, 144, and/or 146 to indicate that the vehicle is coupled with this GW.

In some embodiments, the automatic coupling and decoupling of a gateway and a vehicle in the fleet management system 100 allows to a plug and play use of the gateway devices, which considerably improves the user's experience of the gateway systems. Further, the automatic coupling/decoupling of the devices allows to quickly reconcile data of a same vehicle when the vehicle changes GW or alternatively allows to distinguish between data of two different vehicle when a same GW is swapped from one vehicle to another. In some embodiments, the reconciliation of data can be used to determine accurate usage data of a vehicle over time. For example, the reconciliation of data can be used to generate accurate International Fuel Trade Agreement (IFTA) report for a given vehicle. The system is operative to accurately track the vehicle and its fuel consumption over a period of time even if a GW swap occurred in the vehicle. Similarly, when a GW is swapped from one vehicle to another vehicle, the location and fuel consumption is kept separate in the system 100 when the automatic coupling/decoupling of the vehicles and the GW is performed. The embodiments herein allows to avoid associating the data received from a GW with the wrong vehicle by automatically detecting that a change of GWs or vehicles occurred and automatically coupling/decoupling GWs and vehicles.

In some embodiments, the operations described can be triggered by one or more events. For example, the management server 140 may determines that a period of time has elapsed between a last received data from a given GW and newly received data from the GW. The detection of this intermediary period of time when no data is received from a GW, may cause the management server 140 to perform operations from FIGS. 2A-C to determine whether the GW was swapped to another vehicle. In another example, the management server 140 may determines that a period of time has elapsed between a last received data for a given vehicle and newly received data for the vehicle. The detection of this intermediary period of time, when no data is received for a vehicle, may cause the management server 140 to perform operations from FIGS. 2A-C to determine whether the vehicle has changed GWs. In another example, the management server 140 may determine if there is an indications that a gateway device has been connected or disconnected (e.g., by monitoring changes in cable voltage or gateway power). The detection of the disconnection and reconnection of the gateway device can cause the management server 140 to perform operations from FIGS. 2A-C. In another example, the management server may determine if there is a change in a vehicle identifier that the gateway device is reporting. When a change of the vehicle identifier is reported, the management server can perform operations from FIGS. 2A-C.

Exemplary Electronic Devices

Electronic Device and Machine-Readable Media

One or more parts of the above embodiments may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off, or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long-term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to other electronic device(s) (sometimes referred to as a client electronic device, a client computing device, or a client device) that executes client software (sometimes referred to as client code or an end-user client) to communicate with the service. The server and client electronic devices may be operated by users respectively in the roles of administrator (also known as an administrative user) and end-user.

Alternative embodiments of an electronic device may have numerous variations from that described above. For example, customized hardware and/or accelerators might also be used in an electronic device.

Exemplary Environment

Figure 3:
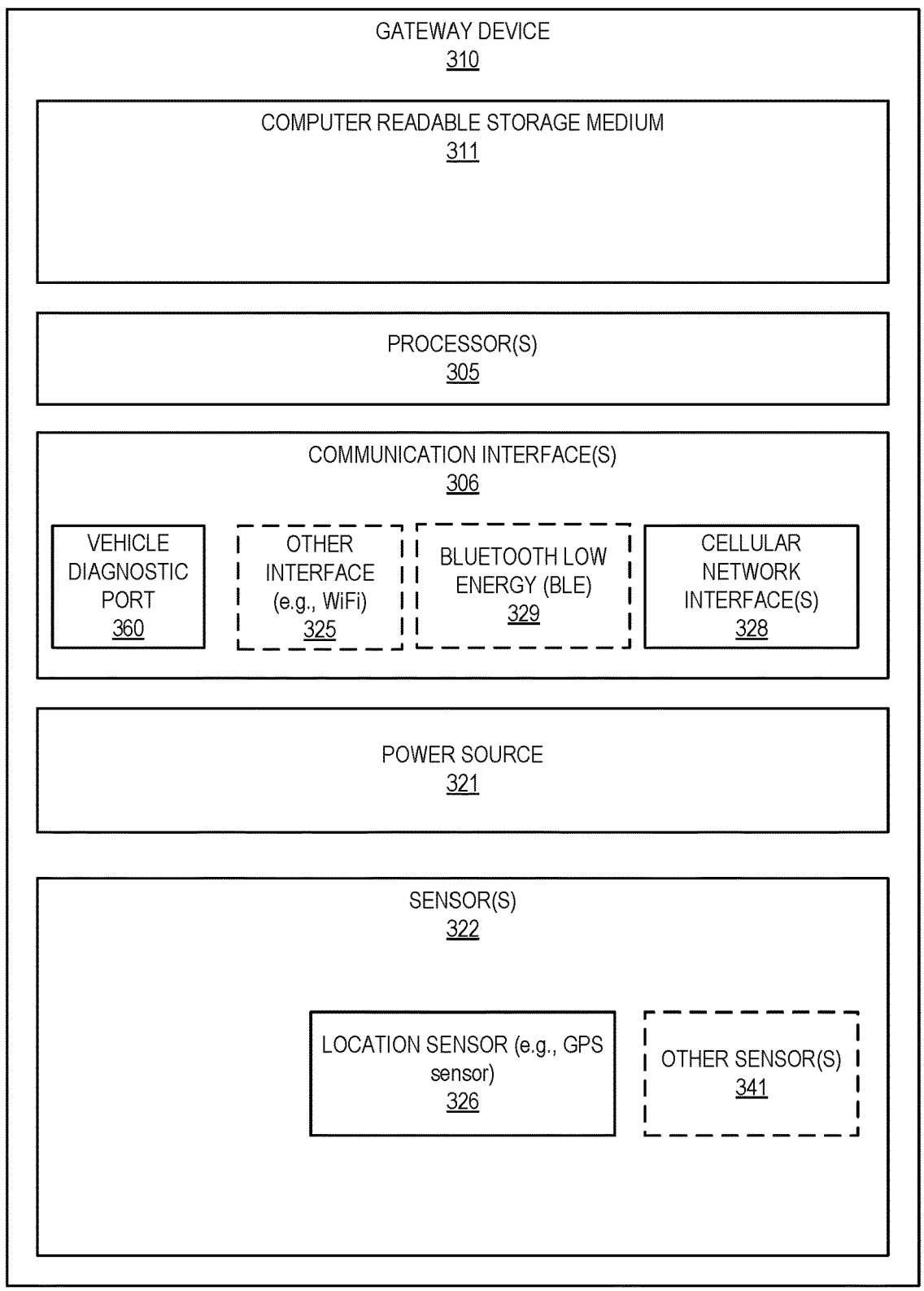
FIG. 3 illustrates a block diagram for an exemplary gateway device that can be used in some embodiments.

FIG. 3 illustrates a block diagram for another exemplary gateway device that can be used in some embodiments. Gateway device 310 includes one or more processors 305 and connected system components (e.g., multiple connected chips). The gateway device 310 includes computer-readable storage medium 311, which is coupled to the processor(s) 305. The computer-readable storage medium 311 may be used for storing data, metadata, and programs for execution by the processor(s) 305. For example, the depicted computer-readable storage medium 311 may code that, when executed by the processor(s) 305, causes the gateway device 310 (e.g., gateway device 110) to transmit data to the management server 140.

The gateway device 310 also includes one or more sensors used to record sensor measurements in response to physical events. For example, the gateway device 310 includes a location sensor (such as a GPS sensor) 326 for recording location readings to indicate the location of the vehicle on which the gateway device is mounted. The gateway device 310 includes an IMU, which includes a motion sensor, such as an accelerometer and is used to determine a measure of the motion of the vehicle on which the gateway device 310 is mounted. The gateway device 310 may include one or more additional sensors 341 (e.g., temperature sensor, humidity sensor, barometric pressure sensor, CO2 concentration sensor, acceleration sensor, sound sensor, movement sensor, etc.). In some embodiments, one or more of the additional sensors can be integrated into the gateway device 310. In other embodiments, one or more of the additional sensors can be separate from the gateway device 310. When an additional sensor is separate from the gateway device 310, it can connect to the gateway device 310 through a wireless communication interface (e.g., a short-range communication interface such as BT or BLE, or other) or alternatively it can connect via a wired communication interface (e.g., a general-purpose input/output (GPIO)).

The gateway device 310 also includes one or more communication interfaces 306, which are provided to allow a user to provide input to, receive output from, and otherwise transfer data to and from the system. Exemplary Input/Output devices and interfaces include wired and wireless transceivers, such as Joint Test Action Group (JTAG) transceiver, a Bluetooth Low Energy (LE) transceiver 329 an IEEE 802.11 transceiver, an infrared transceiver, a wireless cellular communication interface (e.g., 2G, 3G, 4G, 5G, etc.) 428, a diagnostic port 360, or another wireless protocol 325 to connect the gateway device 310 with another device, external component, or a network, and receive stored instructions, data, tokens, etc. It will be appreciated that one or more buses may be used to interconnect the various components shown in FIG. 3. The gateway device 310 includes a power source 321. It will be appreciated that additional components, not shown, may also be part of the gateway device 310, and, in certain embodiments, fewer components than that shown in FIG. 10, may also be used in a gateway device 310.

Figure 4:
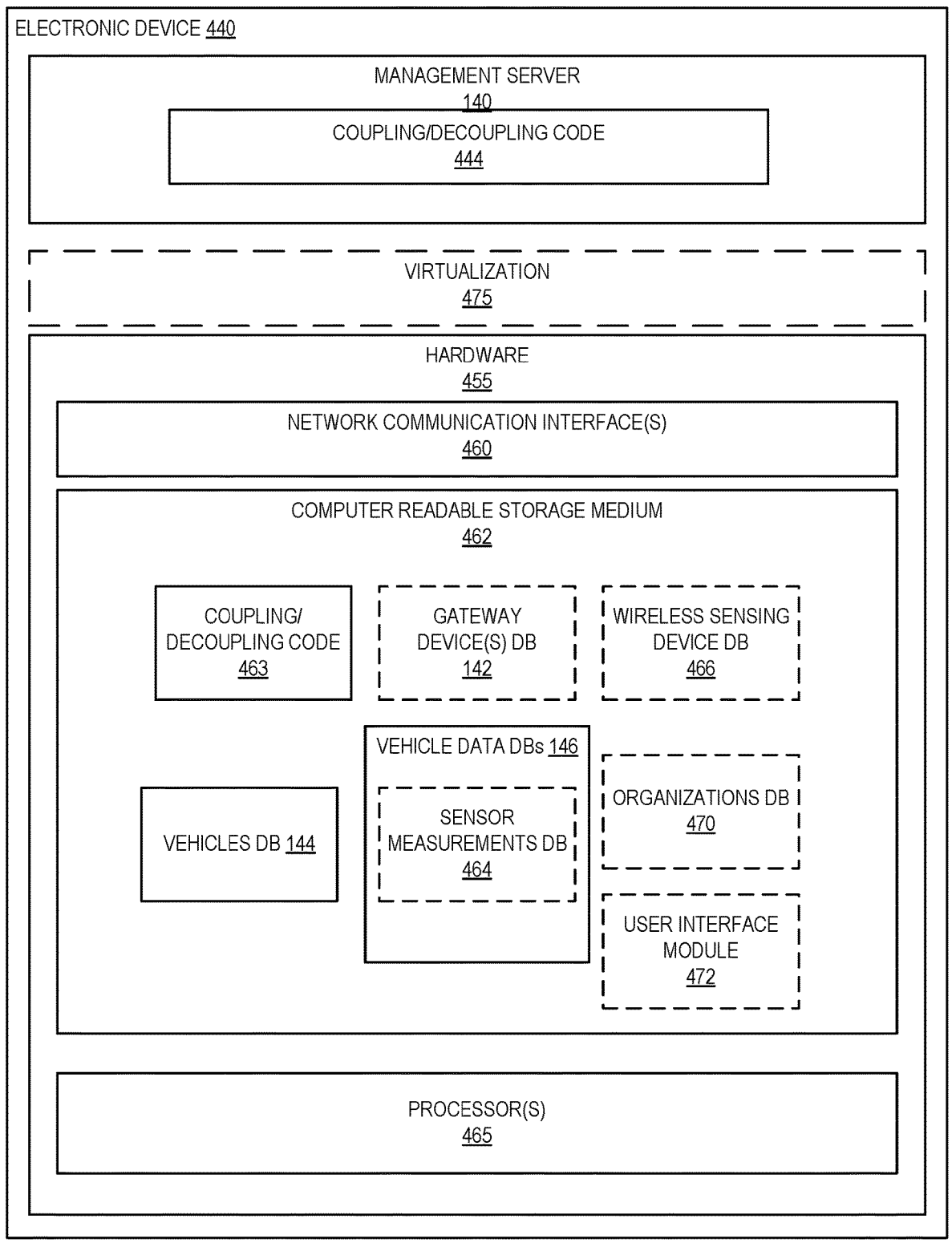
FIG. 4 illustrates a block diagram for an exemplary management server that can be used in some embodiments.

FIG. 4 illustrates a block diagram for an exemplary management server that can be used in some embodiments. Management server 140 may be a web or cloud server, or a cluster of servers, running on server hardware. In one embodiment, the management server 140 works for both single and multi-tenant installations, meaning that multiple organizations with different administrators may have wireless sensing devices and/or gateway devices managed by the same management server.

According to one embodiment, management server 140 is implemented on a server device 480 which includes server hardware 455. Server hardware 455 includes network communication interfaces 460 coupled with one or more processor(s) 465, and a computer-readable storage medium 462. The computer-readable storage medium 462 includes a coupling/decoupling code 463 used, which when executed by one or more processors 465, implements a coupling decoupling unit and causes the management server 140 to perform the operations described above with respect to FIGS. 1-2C.

In an embodiment, the computer-readable storage medium 462 further includes a user interface module 472, which when executed on the processor(s) 465 causes the display of a Web interface on a client device. The Web interface allows administrators and/or users to create and log into an account associated with an organization to which a set of gateway devices belong (e.g., gateway devices 110). A set of WSDs can also belong to the organization and the user interface module 472 can be used for managing and configuring the gateway devices and the WSDs. The computer readable storage medium 462 further includes the vehicle's data database 146 (including data received from one or more gateway device(s) and associated with respective vehicles), an optional sensor measurements database 468 (including data indicative of sensor measurements received from the gateway devices), a gateway devices database 142 (including information regarding the gateway devices), an optional wireless sensing device database 466 (including information regarding the WSDs), and an optional organizations database 470 (including information regarding the organizations to which the WSDs and/or gateway devices belong); and a vehicles database 144 (including information regarding vehicles in the fleet management system).

While one embodiment does not implement virtualization, alternative embodiments may use different forms of virtualization—represented by a virtualization layer 475. In these embodiments, the management server 140, and the hardware that executes it, form a virtual management server which is a software instance of the modules stored on the computer-readable storage medium 462. In electronic devices that use compute virtualization, the set of one or more processor(s) 465 typically execute software to instantiate the virtualization layer 475 and software container(s) (e.g., with operating system-level virtualization, the virtualization layer 475 represents the kernel of an operating system (or a shim executing on a base operating system) that allows for the creation of multiple software containers (representing separate user space instances and also called virtualization engines, virtual private servers, or jails) that may each be used to execute a set of one or more applications; with full virtualization, the virtualization layer 475 represents a hypervisor (sometimes referred to as a virtual machine monitor (VMM)) or a hypervisor executing on top of a host operating system, and the software containers, each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software is executed within the software container on the virtualization layer 475. In electronic devices where compute virtualization is not used, the instance on top of a host operating system is executed on the "bare metal" electronic device. The instantiation of the instance, as well as the virtualization layer and software containers, if implemented, are collectively referred to as software instance(s). The server device 440 can be used to perform the operations of a management server as described with reference to FIGS. 1-2C.

While some components of the gateway device or the management server are illustrated as code stored on the computer-readable storage medium, in other embodiments the modules may be implemented in hardware or in a combination of hardware and software.

CONCLUSION

In the above description, numerous specific details such as resource partitioning/sharing/duplication embodiments, types and interrelationships of system components, and logic partitioning/integration choices are set forth in order to provide a more thorough understanding. It will be appreciated, however, by one skilled in the art, that the invention may be practiced without such specific details. In other instances, control structures, logic embodiments, opcodes, means to specify operands, and full software instruction sequences have not been shown in detail since those of ordinary skill in the art, with the included descriptions, will be able to implement what is described without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations and/or structures that add additional features to some embodiments. However, such notation should not be taken to mean that these are the only options or optional operations, and/or that blocks with solid borders are not optional in certain embodiments.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary embodiments in the other figures. However, the operations of the flow diagrams can be performed by embodiments other than those discussed with reference to the other figures, and the embodiments discussed with reference to these other figures can perform operations different from those discussed with reference to the flow diagrams.

While the flow diagrams in the figures show a particular order of operations performed by certain embodiments, it should be understood that such order is exemplary (e.g., alternative embodiments may perform the operations in a different order, combine certain operations, overlap certain operations, etc.).

While the above description includes several exemplary embodiments, those skilled in the art will recognize that the invention is not limited to the embodiments described and can be practiced with modification and alteration within the spirit and scope of the appended claims. The description is thus illustrative instead of limiting.

What is claimed is:

1. A method performed by a computing device, the method comprising:
   receiving first data from a first gateway device;
   determining that the first data includes an identifier of a first vehicle; and
   responsive to determining that the first data includes the identifier of the first vehicle,
      determining, based on the identifier of the first vehicle, that the first vehicle is a known vehicle in a fleet management system, and
      responsive to determining, based on the identifier of the first vehicle, that the first vehicle is a known vehicle in the fleet management system, coupling the first gateway device with the first vehicle in the fleet management system, wherein the coupling includes updating one or more databases to include the identifier of the first vehicle in relation with an identifier of the first gateway device, wherein the coupling causes data received from the first gateway device to be identified as data of the first vehicle.

2. The method of claim 1 further comprising:
   receiving second data from a second gateway device; and
   responsive to determining that the second data does not include an identifier of a vehicle, determining, based on the second data, that the second gateway device is mounted on a new vehicle for the second gateway device.

3. The method of claim 2, wherein responsive to determining that the second gateway device is mounted on a new vehicle for the second gateway device, identifying the new vehicle.

4. The method of claim 2, wherein the determining that the second gateway device is mounted on a new vehicle for the second gateway device includes:
   determining that the second gateway device is coupled with a second vehicle; and
   determining that data of the second vehicle received from the second gateway device during an earlier interval of time is significantly different from the second data.

5. The method of claim 3, wherein the identifying the new vehicle includes:
   comparing the second data with previously recorded data of one or more other vehicles that are known in the fleet management system; and
   selecting, based on the comparison, one or more candidate vehicles from the other vehicles.

6. The method of claim 5, wherein the identifying the new vehicle further includes:
   transmitting the candidate vehicles to client device of a user; and
   receiving a candidate vehicle from the candidate vehicles selected by the user as the new vehicle.

7. The method of claim 4 further comprising:
   coupling the second gateway device with a selected candidate vehicle in the fleet management system.

8. The method of claim 3, wherein the identifying the new vehicle includes:
   comparing the second data with data of one or more other vehicles that are known in the fleet management system; and
   determining, based on the comparison, that the new vehicle is not a known vehicle in the fleet management system; and
   wherein the method further comprises:
      coupling the second gateway device with a new vehicle in the fleet management system.

9. The method of claim 3, wherein the second data includes engine hours of a vehicle, odometer readings of the vehicle, vehicle identification number (VIN) of the vehicle, engine coolant temperature of the vehicle, engine oil pressure of the vehicle, engine speed of the vehicle, battery voltage of the vehicle, list of diagnostics data available for the vehicle, list of devices attached to the second gateway device, list of devices connected to auxiliary inputs of the second gateway device, devices connected to a hotspot of the second gateway device, tire pressure of the vehicle, an identification of a driver of a vehicle, an identification of one or more trailers attached to the vehicle over time, an identification of a home yard of the vehicle, one or more routes of the vehicle, or any combination thereof.

10. The method of claim 2, wherein the first gateway device and the second gateway device are the same.

11. A non-transitory machine-readable storage medium that provides instructions that, if executed by a processor of a computing device, will cause said computing device to perform operations comprising:
receiving first data from a first gateway device;
determining that the first data includes an identifier of a first vehicle; and
responsive to determining that the first data includes the identifier of the first vehicle,
determining, based on the identifier of the first vehicle, that the first vehicle is a known vehicle in a fleet management system, and
responsive to determining, based on the identifier of the first vehicle, that the first vehicle is a known vehicle in the fleet management system, coupling the first gateway device with the first vehicle in the fleet management system, wherein the coupling includes updating one or more databases to include the identifier of the first vehicle in relation with an identifier of the first gateway device, wherein the coupling causes data received from the first gateway device to be identified as data of the first vehicle.

12. The non-transitory machine-readable storage medium of claim 11, wherein the operations further comprise:
receiving second data from a second gateway device; and
responsive to determining that the second data does not include an identifier of a vehicle, determining, based on the second data, that the second gateway device is mounted on a new vehicle for the second gateway device.

13. The non-transitory machine-readable storage medium of claim 12, wherein responsive to determining that the second gateway device is mounted on a new vehicle for the second gateway device, identifying the new vehicle.

14. The non-transitory machine-readable storage medium of claim 12, wherein the determining that the second gateway device is mounted on a new vehicle for the second gateway device includes:
determining that the second gateway device is coupled with a second vehicle; and
determining that data of the second vehicle received from the second gateway device during an earlier interval of time is significantly different from the second data.

15. The non-transitory machine-readable storage medium of claim 13, wherein the identifying the new vehicle includes:
comparing the second data with previously recorded data of one or more other vehicles that are known in the fleet management system; and
selecting, based on the comparison, one or more candidate vehicles from the other vehicles.

16. The non-transitory machine-readable storage medium of claim 15, wherein the identifying the new vehicle further includes:
transmitting the candidate vehicles to client device of a user; and
receiving a candidate vehicle from the candidate vehicles selected by the user as the new vehicle.

17. The non-transitory machine-readable storage medium of claim 14, wherein the operations further comprise:
coupling the second gateway device with a selected candidate vehicle in the fleet management system.

18. The non-transitory machine-readable storage medium of claim 13, wherein the identifying the new vehicle includes:
comparing the second data with data of one or more other vehicles that are known in the fleet management system; and
determining, based on the comparison, that the new vehicle is not a known vehicle in the fleet management system; and
wherein the operations further comprise:
coupling the second gateway device with a new vehicle in the fleet management system.

19. The non-transitory machine-readable storage medium of claim 13, wherein the second data includes engine hours of a vehicle, odometer readings of the vehicle, fuel level of the vehicle, Diesel Exhaust Fluid (DEF) level of the vehicle, tire pressure of the vehicle, an identification of a driver of a vehicle, an identification of one or more trailers attached to the vehicle over time, an identification of a home yard of the vehicle, one or more routes of the vehicle, or any combination thereof.

20. The non-transitory machine-readable storage medium of claim 12, wherein the first gateway device and the second gateway device are the same.

* * * * *